(12) United States Patent
Wallace

(10) Patent No.: US 8,398,729 B2
(45) Date of Patent: Mar. 19, 2013

(54) GASIFICATION SYSTEMS FOR PARTIAL MODERATOR BYPASS

(75) Inventor: Paul Steven Wallace, Katy, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/217,470

(22) Filed: Aug. 25, 2011

(65) Prior Publication Data
US 2011/0305609 A1  Dec. 15, 2011

Related U.S. Application Data

(62) Division of application No. 12/606,427, filed on Oct. 27, 2009, now Pat. No. 8,038,747, which is a division of application No. 11/304,471, filed on Dec. 15, 2005, now Pat. No. 7,621,973.

(51) Int. Cl.
*B01J 7/00* (2006.01)
(52) U.S. Cl. ......... 48/61; 48/76; 48/69; 48/206; 48/128; 48/127.1; 48/127.9; 48/197 R; 48/71; 48/72; 48/116; 48/117; 48/77; 48/63; 48/74; 48/203; 48/212; 48/213; 165/156; 165/160; 122/7; 422/643; 423/650
(58) Field of Classification Search ................ 48/61, 76, 48/127.9
See application file for complete search history.

(56) References Cited

U.S. PATENT DOCUMENTS

| | | | |
|---|---|---|---|
| 1,821,263 A | 9/1931 | Imbert | |
| 1,913,968 A | 6/1933 | Winkler | |
| 3,208,830 A | 9/1965 | Knight et al. | |
| 4,306,506 A * | 12/1981 | Rotter | 110/229 |
| 4,309,195 A * | 1/1982 | Rotter | 48/76 |
| 4,328,008 A | 5/1982 | Muenger et al. | |
| 4,441,892 A | 4/1984 | Schuster | |
| 4,494,963 A | 1/1985 | Reich | |
| 4,650,651 A * | 3/1987 | Fuderer | 422/628 |
| 5,251,433 A | 10/1993 | Wallace | |
| 5,345,756 A | 9/1994 | Jahnke et al. | |
| 5,814,189 A | 9/1998 | Stigsson et al. | |
| 5,937,652 A | 8/1999 | Abdelmalek | |
| 6,004,379 A | 12/1999 | Wallace et al. | |
| 6,269,286 B1 | 7/2001 | Tse et al. | |
| 6,274,030 B1 | 8/2001 | Wallace et al. | |
| 6,282,880 B1 | 9/2001 | Wallace et al. | |
| 6,303,089 B1 | 10/2001 | Wallace et al. | |

(Continued)

FOREIGN PATENT DOCUMENTS

EP  1526165 A1  4/2005
JP  56-086991 A  7/1981

(Continued)

OTHER PUBLICATIONS

JP Office Action dated Jul. 10, 2012 from corresponding JP Application No. 2006-337978 along with English translation.

(Continued)

*Primary Examiner* — Kaity V. Handal
(74) *Attorney, Agent, or Firm* — Armstrong Teasdale LLP

(57) ABSTRACT

Methods and systems for a gasifier having a partial moderator bypass are provided. The gasifier includes a partial oxidation reactor including an inlet and an outlet and a primary reaction zone extending therebetween, the partial oxidation reactor configured to direct a flow of products of partial oxidation including fuel gases, gaseous byproducts of partial oxidation, and unburned carbon, and a secondary reaction chamber coupled in flow communication with the partial oxidation reactor, the secondary reaction chamber is configured to mix a flow of moderator with the flow of gaseous byproducts of partial oxidation and unburned carbon such that a concentration of fuel gases is increased.

7 Claims, 3 Drawing Sheets

U.S. PATENT DOCUMENTS

| | | |
|---|---|---|
| 6,333,015 B1 | 12/2001 | Lewis |
| 6,409,912 B1 | 6/2002 | Wallace et al. |
| 6,413,491 B1 * | 7/2002 | Aoyama .................. 423/650 |
| 6,416,568 B1 | 7/2002 | Wallace et al. |
| 6,533,925 B1 | 3/2003 | Wallace et al. |
| 6,550,252 B2 | 4/2003 | Wallace et al. |
| 6,588,212 B1 | 7/2003 | Wallace et al. |
| 6,613,125 B1 | 9/2003 | Wallace et al. |
| 6,773,630 B2 | 8/2004 | Stellaccio |
| 6,810,821 B2 | 11/2004 | Chan |
| 7,004,985 B2 | 2/2006 | Wallace et al. |
| 7,214,720 B2 | 5/2007 | Bayle et al. |
| 7,402,188 B2 | 7/2008 | Sprouse |
| 2002/0004533 A1 | 1/2002 | Wallace et al. |
| 2002/0121093 A1 | 9/2002 | Wallace et al. |
| 2004/0045272 A1 * | 3/2004 | Miyoshi et al. .......... 60/39.12 |
| 2005/0175533 A1 * | 8/2005 | Thomas et al. .......... 423/657 |

FOREIGN PATENT DOCUMENTS

| | | |
|---|---|---|
| JP | 60122701 A | 7/1985 |
| JP | 63182201 A | 7/1988 |
| JP | 63225510 A | 9/1988 |
| JP | H01-501395 A | 5/1989 |
| JP | 2005002306 A | 1/2005 |
| WO | 87/04453 A1 | 7/1987 |
| WO | 02097015 A2 | 12/2002 |
| WO | 03095072 A1 | 11/2003 |
| WO | 2006026046 A1 | 3/2006 |

OTHER PUBLICATIONS

Japanese Notice of Allowance received for related application 2006337978 dated Oct. 23, 2012.

* cited by examiner

GASIFICATION SYSTEMS FOR PARTIAL MODERATOR BYPASS

This application is a divisional of U.S. patent application Ser. No. 12/606,427 filed Oct. 27, 2009, presently U.S. Pat. No. 8,038,747, which is a divisional of U.S. application. No. 11/604,471 on Dec. 15, 2005 now U.S. Pat. No. 7,621,973, issued Nov. 24, 2009, both of which are hereby incorporated by reference and are assigned to the assignee of the present invention.

BACKGROUND OF THE INVENTION

This invention relates generally to integrated gasification combined-cycle (IGCC) power generation systems, and more specifically to improving gasifier performance using partial moderator bypass.

At least some known IGCC systems include a gasification system that is integrated with at least one power producing turbine system. For example, known gasifiers convert a mixture of fuel, air or oxygen, steam, and/or limestone into an output of partially oxidized gas, sometimes referred to as "syngas." The syngas is supplied to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

To achieve a pumpable slurry concentration, at least some know gasification systems feed excess water moderator to the gasifier. Excess water moderator is also used where a high hydrogen content syngas is desirable. In addition, recycle $CO_2$ to the gasifier is also used for IGCC to increase CO content (syngas lower heating value (LHV)) and carbon conversion. However, this excess moderator can cool the syngas below the slag fusion point resulting in higher than optimal oxygen consumption, and decreased syngas production.

BRIEF DESCRIPTION OF THE INVENTION

In one embodiment, a gasifier having a partial moderator bypass includes a partial oxidation reactor including an inlet and an outlet and a primary reaction zone extending therebetween, the partial oxidation reactor configured to direct a flow of products of partial oxidation including fuel gases, gaseous byproducts of partial oxidation, and unburned carbon, and a secondary reaction chamber coupled in flow communication with the partial oxidation reactor, the secondary reaction chamber is configured to mix a flow of moderator with the flow of gaseous byproducts of partial oxidation and unburned carbon such that a concentration of fuel gases is increased.

In another embodiment, a method of generating fuel gas in a gasifier includes partially oxidizing a fuel in the gasifier such that a flow of products of partial oxidation are generated, the products of partial oxidation including flowable slag, particulate components and gaseous components. The method further includes removing the flowable slag and a portion of the particulate components from the products of partial oxidation, injecting a flow of moderator into the flow of the remaining products of partial oxidation, and generating a fuel gas from the mixture of the particulate components and the moderator.

In yet another embodiment, a gasification system includes a pressure vessel including a partial oxidation reactor configured to direct products of partial oxidation to an outlet passage, the products of partial oxidation including fuel gas, unburned carbon, and carbon dioxide, and a carbon dioxide recycle system configured to recover carbon dioxide from the products of partial oxidation and to inject the carbon dioxide into the gasifier as a moderator, wherein the pressure vessel further includes, a secondary reaction chamber coupled in flow communication with the partial oxidation reactor, the secondary reaction chamber configured to receive the flow of carbon dioxide, a fallout zone in flow communication with the secondary reaction chamber, the fallout zone configured to facilitate separation of solid products of partial oxidation from gaseous products of partial oxidation.

DETAILED DESCRIPTION OF THE INVENTION

Figure 1:
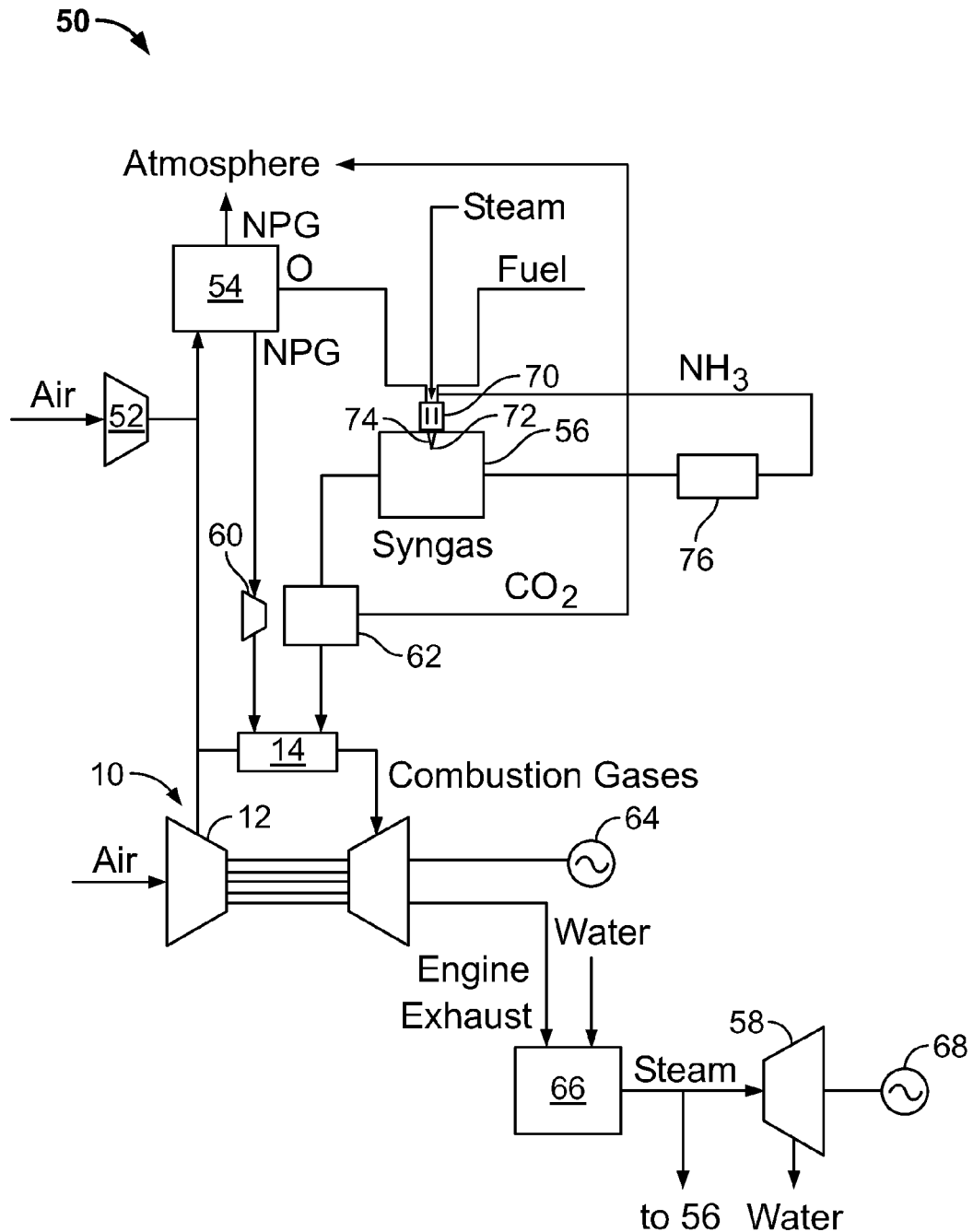
FIG. 1 is a schematic diagram of an exemplary known integrated gasification combined-cycle (IGCC) power generation system.

FIG. 1 is a schematic diagram of an exemplary integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas." The process gas generated by air separation unit 54 includes nitrogen and will be referred to herein as "nitrogen process gas." The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially oxidized gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a primary reaction zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the primary reaction zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 52 may be cleaned in a clean-up device 62 before being channeled to gas turbine engine combustor 14 for combustion thereof Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 52 for generating the syngas.

Figure 2:
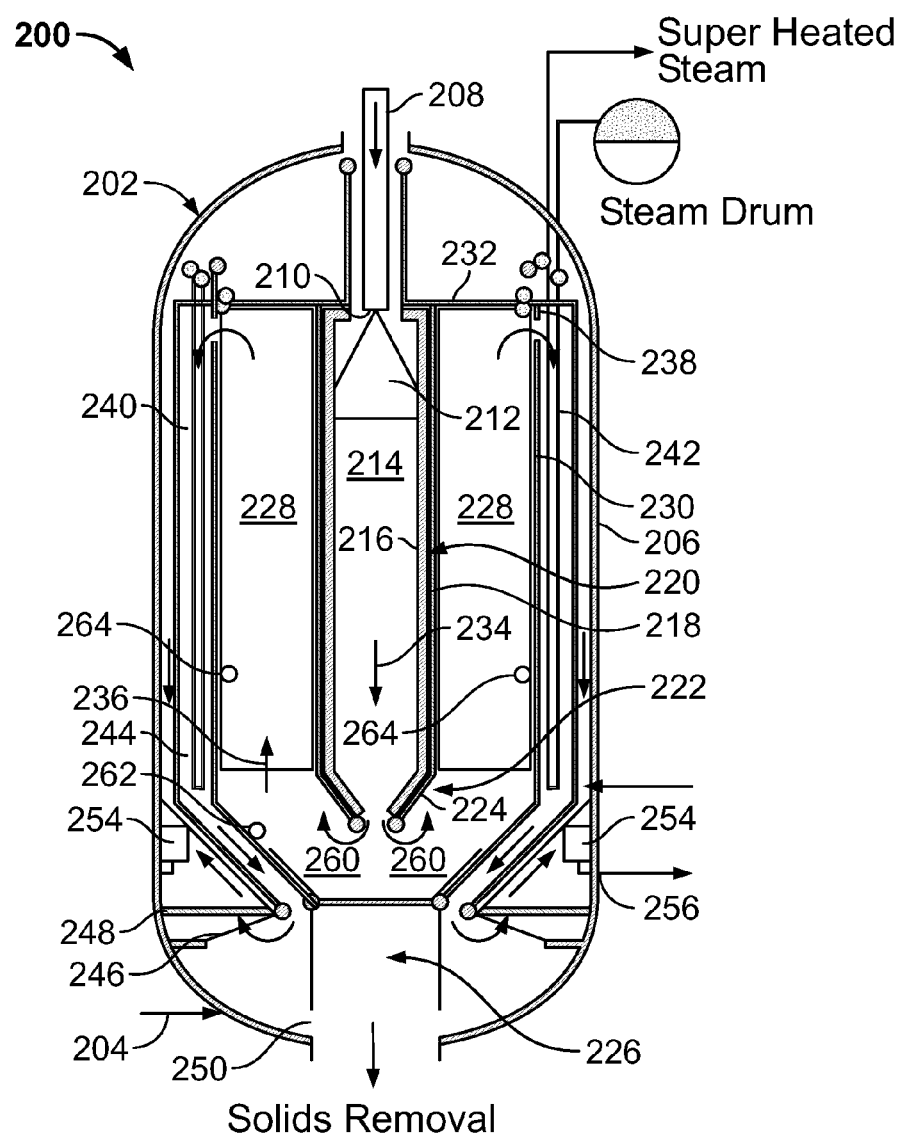
FIG. 2 is a schematic view of an exemplary embodiment of a partial moderator bypass gasifier that may be used with the system shown in FIG. 1.

FIG. 2 is a schematic view of an exemplary embodiment of a partial moderator bypass gasifier 200 that may be used with system 50 (shown in FIG. 1). In the exemplary embodiment, gasifier 200 includes an upper shell 202, a lower shell 204, and a substantially cylindrical vessel body 206 extending therebetween. A feed injector 208 penetrates upper shell 202 to channel a flow of fuel into gasifier 200. The fuel is transported through one or more passages in feed injector 208 and exits a nozzle 210 that directs the fuel in a predetermined pattern 212 into a primary reaction zone 214 in gasifier 200. The fuel may be mixed with other substances prior to entering nozzle 210 or may be mixed with other substances while exiting from nozzle 210. For example, the fuel may be mixed with fines recovered from a process of system 50 prior to entering nozzle 210 and the fuel may be mixed with an oxidant, such as air or oxygen at nozzle 210 or downstream of nozzle 210.

In the exemplary embodiment, primary reaction zone 214 is a vertically oriented substantially cylindrical space co-aligned and in serial flow communication with nozzle 210. An outer periphery of primary reaction zone 210 is defined by a refractory wall 216 comprising a structural substrate, such as an Incoloy pipe 218 and a refractory coating 220 configured to resist the effects of the relatively high temperature and high pressure contained within primary reaction zone 210. An outlet end 222 of refractory wall 216 includes a convergent outlet nozzle 224 configured to maintain a predetermined back pressure in primary reaction zone 214 while permitting products of partial oxidation and syngas generated in primary reaction zone 214 to exit primary reaction zone 214. The products of partial oxidation include gaseous byproducts, a slag formed generally on refractory coating 220, unburned carbon, and fine particulates carried in suspension with the gaseous byproducts.

After exiting primary reaction zone 214, the flowable slag and solid slag fall by gravity influence into a lockhopper 226 in bottom shell 204. Lockhopper 226 is maintained with a level of water that quenches the flowable slag into a brittle solid material that may be broken in smaller pieces upon removal from gasifier 200. Lockhopper 226 also traps approximately ninety percent of fine particulate exiting primary reaction zone 214.

In the exemplary embodiment, an annular reaction chamber 228 at least partially surrounds primary reaction zone 214. Secondary reaction chamber 228 is defined by refractory wall 216 at an inner periphery and a cylindrical shell 230 coaxially aligned with primary reaction zone 214 at a radially outer periphery of secondary reaction chamber 228. Secondary reaction chamber 228 is closed at the top by a top flange 232. The gaseous byproducts, unburned carbon, and remaining ten percent of the fine particulate are channeled from a downward direction 234 in primary reaction zone 214 to an upward direction 236 in secondary reaction chamber 228. The rapid redirection at outlet nozzle 224 facilitates fine particulate and slag separation from the gaseous byproducts.

As the gaseous byproducts, unburned carbon, and remaining ten percent of the fine particulate are channeled into secondary reaction chamber 228 a flow of moderator is added to the gaseous byproducts, unburned carbon, and remaining fine particulate. The moderator may include $CO_2$ and/or water, which may be in the form of steam. The moderator moderates the temperature of secondary reaction chamber 228. The moderator may be added to secondary reaction chamber 228 by spray at an inlet 260 or the addition of the moderator may be staged along a length of secondary reaction chamber 228 in the direction 236 of flow through secondary reaction chamber 228. For example, a first portion of the moderator may be added to secondary reaction chamber 228 through a first header 262 and a second portion of the moderator may be added through a second header 264 spaced downstream from first header 262. In various embodiments, greater than two headers are spaced in secondary reaction chamber 228 to permit various combinations for staged introduction of the moderator to accommodate different operating conditions within gasifier 200. In the exemplary embodiment, $CO_2$ in the moderator combines with unburned carbon in secondary reaction chamber 228 to form CO in an endothermic reaction that converts a portion of the heat energy in secondary reaction chamber 228 to chemical energy in the generated CO. For example, the gaseous byproducts, unburned carbon, and remaining fine particulate enter secondary reaction chamber 228 from partial oxidation reactor 214 at approximately 2500° Fahrenheit and exit secondary reaction chamber 228 at approximately 1800° Fahrenheit. The $CO_2$ in the moderator may be recovered from syngas exiting the gasifier or may be recycled from another process in system 50.

The gaseous byproducts and remaining ten percent of the fine particulate are transported upward through secondary reaction chamber 228 to a first passage outlet 238. During the transport of the gaseous byproducts through secondary reaction chamber 228, heat may be recovered from the gaseous byproducts and the fine particulate. For example, the gaseous byproducts enter secondary reaction chamber 228 at a temperature of approximately 2500° Fahrenheit and when exiting secondary reaction chamber 228 the temperature of gaseous byproducts is approximately 1800° Fahrenheit. The gaseous byproducts and fine particulates exit secondary reaction chamber 228 through first passage outlet 238 into a second annular passage 240 where the gaseous byproducts and fine particulates are redirected to a downward flow direction. As the flow of gaseous byproducts and the fine particulates is transported through second passage 240, heat may be recovered from the flow of gaseous byproducts and the fine particulates using for example, superheat tubes 242 that remove heat from the flow of gaseous byproducts and the fine particulates and transfer the heat to steam flowing through an inside passage of superheat tubes 242. For example, the gaseous byproducts enter second passage 240 at a temperature of approximately 1800° Fahrenheit and exit second passage 240 at a temperature of approximately 1500° Fahrenheit. When the flow of gaseous byproducts and the fine particulates reach a bottom end 244 of second passage 240 that is proximate bottom shell 204, second passage 240 converges toward lockhopper 226. At bottom end 244, the flow of gaseous byproducts and the fine particulates is channeled in an upward direction through a water spray 246 that desuperheats the flow of gaseous byproducts and the fine particulates. The heat removed from the flow of gaseous byproducts and the fine particulates tends to vaporize water spray 246 and agglomerate the fine particulates such that the fine particulates form a relatively larger ash clod that falls into lower shell 204. The flow of gaseous byproducts and the remaining fine particulates are channeled in a reverse direction and directed to an underside of a perforated plate 448 plate forms an annular tray circumscribing bottom end 244. A level of water is maintained above perforated plate 448 to provide a contact medium for removing additional fine particulate from the flow of gaseous byproducts. As the flow of gaseous byproducts and the remaining fine particulates percolates up through the perforations in perforated plate 448, the fine particulates contact the water and are entrapped in the water bath and carried downward through the perforations into a sump of water in the bottom shell 204. A gap 250 between a bottom of lockhopper 226 and bottom shell 204 permits the fine particulates to flow through to lockhopper 226 where the fine particulates are removed from gasifier 200.

An entrainment separator 254 encircles an upper end of lower shell 204 above perforated plate 248 and the level of water above perforated plate 248. Entrainment separator 254 may be for example, a cyclonic or centrifugal separator comprises a tangential inlet or turning vanes that impart a swirling motion to the gaseous byproducts and the remaining fine particulates. The particulates are thrown outward by centrifugal force to the walls of the separator where the fine particulates coalesce and fall down a wall of the separator bottom shell 204. Additionally, a wire web is used to form a mesh pad wherein the remaining fine particulates impact on the mesh pad surface, agglomerate with other particulates drain off with the aid of a water spray by gravity to bottom shell 204. Further, entrainment separator can be of a blade type such as a chevron separator or an impingement separator. In the chevron separator, the gaseous byproducts pass between blades and are forced to travel in a zigzag pattern. The entrained particulates and any liquid droplets cannot follow the gas streamlines, so they impinge on the blade surfaces, coalesce, and fall back into bottom shell 204. Special features such as hooks and pockets can be added to the sides of the blades to facilitate improving particulates and liquid droplet capture. Chevron grids can be stacked or angled on top of one another to provide a series of separation stages. Impingement separators create a cyclonic motion as the gaseous byproducts and fine particulates pass over curved blades, imparting a spinning motion that causes the entrained particulates and any liquid droplets to be directed to the vessel walls, where the entrained particulates and any liquid droplets are collected and directed to bottom shell 204.

The flow of gaseous byproducts and any remaining fine particulates enter separator 254 where substantially all of the remaining entrained particulates and any liquid droplets are removed form the flow of gaseous byproducts. The flow of gaseous byproducts exits the gasifier through an outlet 256 for further processing.

Figure 3:
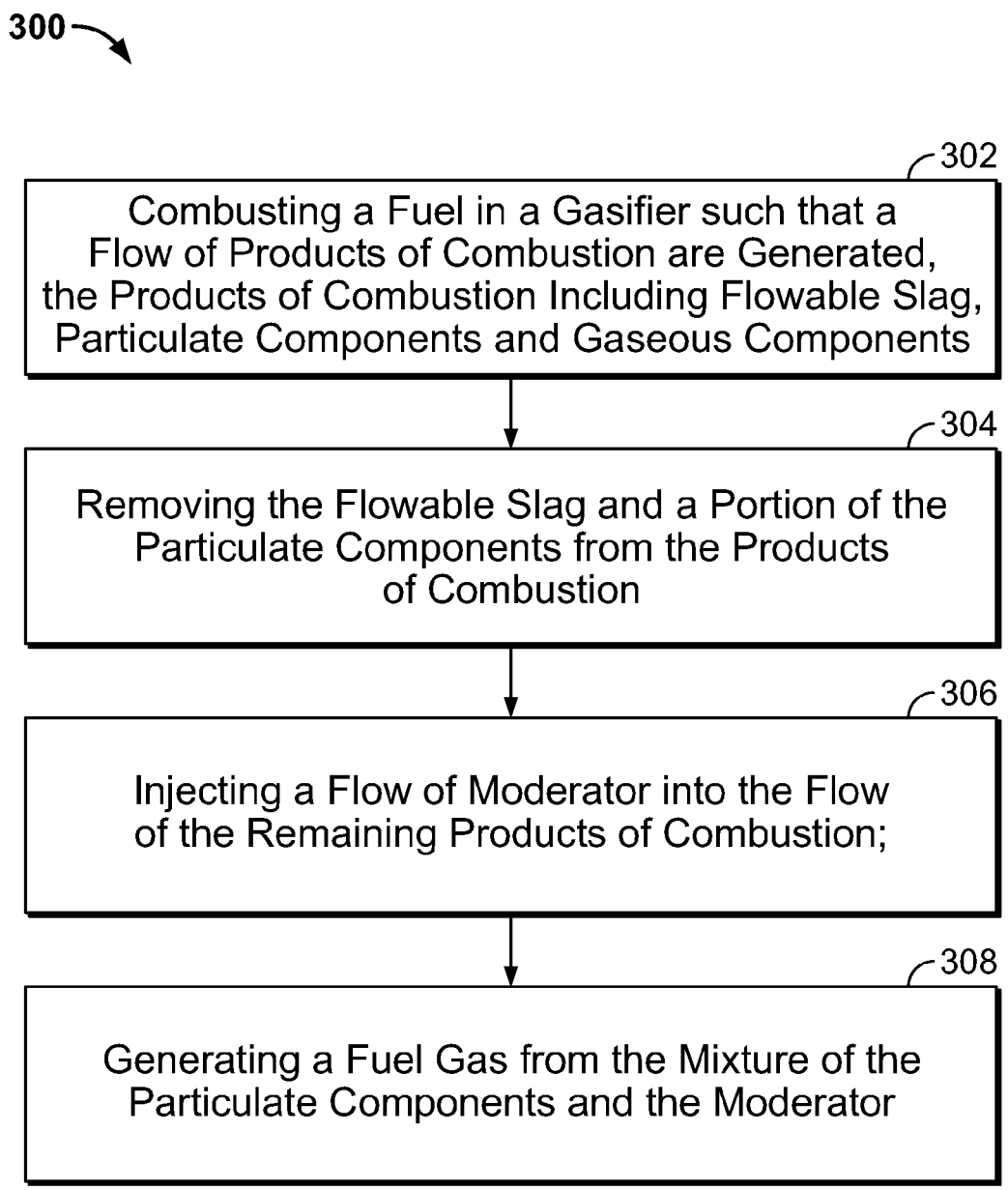
FIG. 3 is a flow chart of an exemplary method of generating fuel gas in a gasifier.

FIG. 3 is a flow chart of an exemplary method 300 of generating fuel gas in a gasifier. The method includes partially oxidizing 302 a fuel in the gasifier such that a flow of products of partial oxidation are generated, the products of partial oxidation including flowable slag, particulate components and gaseous components. The fuel in the exemplary embodiment is generally a carbonaceous fuel in a slurry or liquid form, for example, a coal slurry or an oil. The fuel is injected into a partial oxidation reactor where the fuel is burned incompletely, forming unburned carbon. Minerals in the fuel form a flowable slag that generally agglomerates on the walls of the partial oxidation reactor and flows out of a bottom outlet of the partial oxidation reactor. Particulate components of the products of partial oxidation are carried along with the gaseous components out of the partial oxidation reactor to a fall out zone. The flowable slag and a portion of the particulate components are removed 304 from the products of partial oxidation in the fallout zone. A flow of moderator is injected 306 into the flow of the remaining products of partial oxidation, and a fuel gas is generated 308 from the mixture of the particulate components and the moderator. In the exemplary embodiment, the moderator includes $CO_2$ and/or steam and the particulate components include unburned carbon. The CO2 and unburned carbon combine to form CO a form of fuel gas Exemplary embodiments of gasification systems and methods of generating a fuel gas in a gasifier are described above in detail. The gasification system components illustrated are not limited to the specific embodiments described herein, but rather, components of each system may be utilized independently and separately from other components described herein. For example, the gasification system components described above may also be used in combination with different IGCC system components.

While the invention has been described in terms of various specific embodiments, those skilled in the art will recognize that the invention can be practiced with modification within the spirit and scope of the claims.

What is claimed is:

1. A gasifier comprising:
a partial oxidation reactor comprising an inlet and an outlet and a primary reaction zone extending therebetween, said reactor configured to direct a flow of products of partial oxidation comprising fuel gases, gaseous byproducts of partial oxidation, and unburned carbon; and
a secondary reaction chamber coupled in flow communication with said partial oxidation reactor, said secondary reaction chamber is configured to mix a flow of moderator with the flow of gaseous byproducts of partial oxidation and unburned carbon such that a concentration of fuel gases is increased; wherein the secondary reaction chamber extends circumferentially about at least a portion of said partial oxidation reactor.

2. A system in accordance with claim 1 further comprising a moderator injection header extending at least partially around said secondary reaction chamber, said moderator injection header configured to direct a flow of moderator such that the moderator and the products of partial oxidation are facilitated being mixed.

3. A system in accordance with claim 2 further comprising a plurality of moderator injection headers, each extending at least partially around said secondary reaction chamber, each said moderator injection header is configured to direct a flow of moderator such that the moderator and the products of partial oxidation are facilitated being mixed wherein the injection of the moderator from each header is at least one of simultaneous and staged.

4. A system in accordance with claim 1 wherein said products of partial oxidation comprises fuel gases, gaseous byproducts of partial oxidation, unburned carbon, flowable slag, and particulates said system further comprising a fallout zone in flow communication with said partial oxidation reactor, said fallout zone configured to reduce a velocity of the flow of products of partial oxidation such that the flowable slag and at least a portion of the particulates are facilitated being removed from the flow of products of partial oxidation.

5. A system in accordance with claim 1 wherein the concentration of fuel gases is increased by a chemical reaction that converts a portion of carbon dioxide in the moderator and a portion of unburned carbon in the flow of products of partial oxidation to carbon monoxide.

6. A system in accordance with claim 1 wherein the concentration of fuel gases is increased by an endothermic chemical reaction that converts a portion of the heat energy in the secondary reaction chamber to chemical energy in the fuel gases.

7. A system in accordance with claim 1 wherein said secondary reaction chamber is configured to receive the flow discharged from said partial oxidation reactor at approximately 2500° Fahrenheit and discharge a flow at approximately 1800° Fahrenheit.

* * * * *